United States Patent Office 3,459,415
Patented Aug. 5, 1969

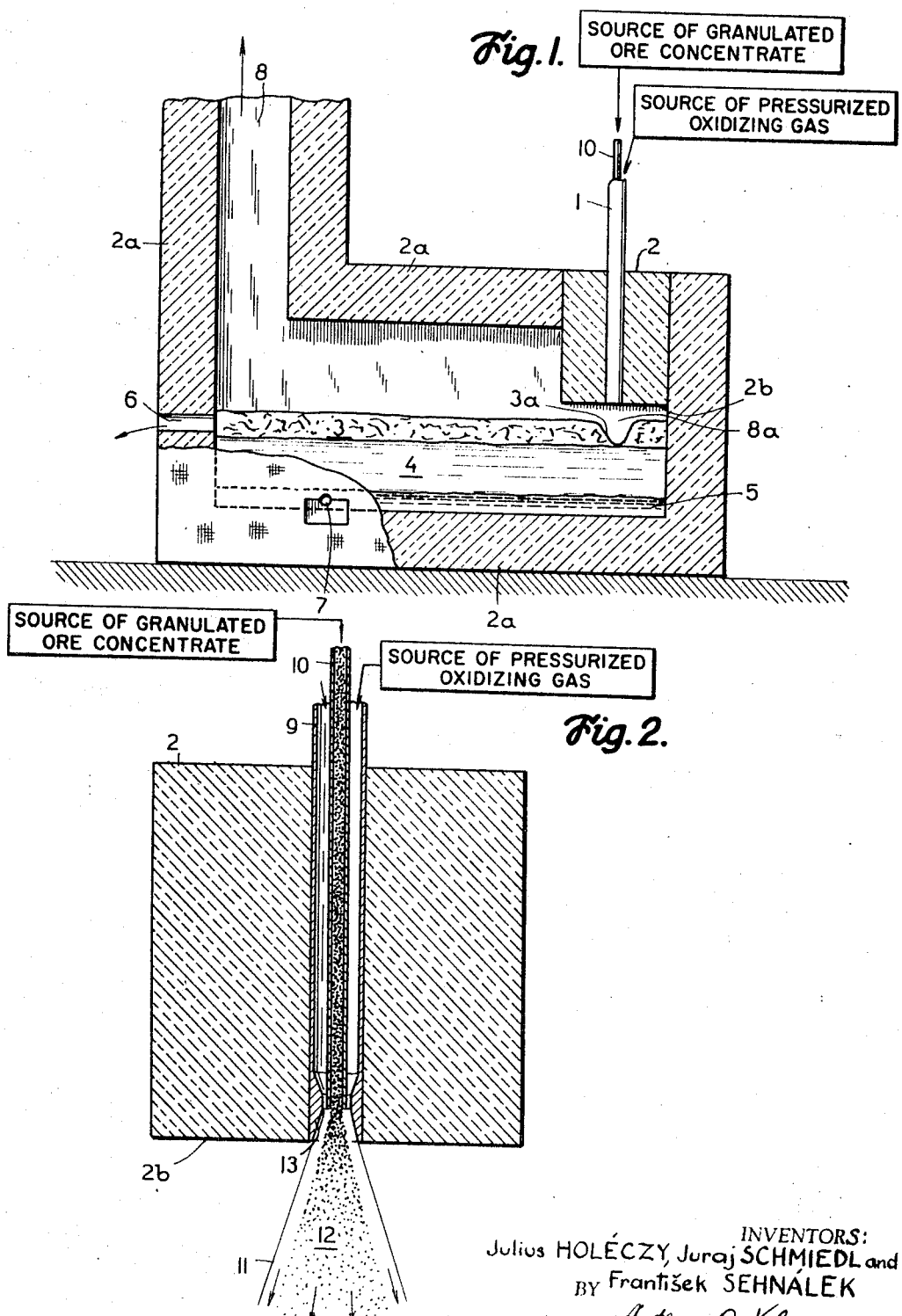

3,459,415
APPARATUS FOR THE CONTINUOUS PRODUCTION OF CONVERTER COPPER
Julius Holéczy, Juraj Schmiedl, and František Sehnálek, Kosice, Czechoslovakia, assignors to Vyskumny ustav kovu Panenske Brezany, a firm of Czechoslovakia
Filed Oct. 15, 1965, Ser. No. 496,426
Int. Cl. C22b 15/06
U.S. Cl. 266—11                    7 Claims

ABSTRACT OF THE DISCLOSURE

An apparatus for continuously producing converter copper from finely granulated copper-bearing sulfidic materials. A stationary converter having walls made of refractory materials. Two co-axial tubes extending through a block made of special refractory protective material which forms part of the walls of the converter. A first outer tube of the two co-axial tubes serves as an inlet for pressurized oxidizing gas and a second inner tube serves as an inlet for conducting granulated ore concentrates into the converter. The ore concentrate melts in the converter which is being heated, thereby forming a bottom layer of metallic converter copper, a middle layer of white matte and a top layer of slag. The outlet ends of the two co-axial tubes, being spaced at an optimum distance from the top layer so that a protective coating of constant thickness forms on said block of special protective refractory material. Suitable outlets disposed in the converter for continuously withdrawing slag and metallic converter copper.

---

The present invention relates to an apparatus and method for continuously producing converter copper from copper-bearing sulfidic materials in an equipment specially adapted therefor and developed for this purpose.

The known methods for producing converter copper comprise generally three steps, namely:

(a) Roasting the ore concentrates in a roasting furnace to remove a predetermined amount of sulphur;

(b) Smelting the concentrate to separate it into various layers and thereby to obtain the matte of metallic sulfides; and (c) Subjecting the matte to a converting operation and thereby obtain relatively pure copper.

The aforedescribed three separate steps of the known methods may be combined by either combining the roasting and smelting steps, or by carrying out the smelting operation without prior roasting of the raw material. It is even known to combine the roasting, smelting and converting steps in a single operation in a single converter. However, this combined process is carried out in a converter of classical known design which has many important disadvantages, as will be pointed out below.

For example, in the aforementioned single operation in a single converter furnace, the entire process must, by necessity, progress discontinuously. Thus, in a first period, oxidation and slagging of iron occurs, and in a second period, oxidation of cuprous sulfides to converter copper occurs.

The discontinuous nature of the operation of the aforedescribed method requires a considerable labor force when the method is used on an industrial scale and, consequently, this method is not economical.

Furthermore, in the aforedescribed discontinuous processes, the subsequent filtering of the copper smelter smokes (fly ash trapping) cannot be nearly made to be 100% efficient and therefore the overall yield of useful byproducts of the process is relatively low.

In addition, thereto, it should be noted that the plant installation itself for the aforedescribed discontinuous process is quite costly and, consequently, the process itself is even more uneconomical from an overall economic point of view.

It is a general object of this invention to provide an improved apparatus and method for the continuous production of converter copper from copper containing sulfidic ores.

It is a more specific object of this invention to provide an improved and specially designed apparatus and an improved method for the continuous production of converter copper which eliminates to a large extent all of the disadvantages and shortcomings of the known processes and known apparatuses.

It has been observed that, when feeding sulfidic copper ore concentrates into an apparatus forming part of this invention and thereafter smelting the copper concentrates in said apparatus, three separate layers are formed in said apparatus. These layers are: (a) a layer of converter copper, (b) a layer of so-called "white matte" (an impure mixture of iron and copper sulfides), and (c) a layer of slag. This formation of separate layers cannot be fully explained and is apparently due to the limited mutual solubility of the substances located in the three separate layers and their differing specific weights. In order to obtain a proper separation of the layers during smelting it is, however, necessary that an appropriate amount of pressurized oxidizing gas is injected into the apparatus simultaneously with the passing of the charge of ore concentrate. The three layers that are then formed in the apparatus comprise a top layer of slag, a middle layer of "white matte," and a bottom layer of converter copper.

The separation of the smelted copper ore concentrate into three layers is thus brought about by the action of the pressurized oxidizing gas not only due to the limited solubility and differing specific weights of the constituents of the aforementioned three layers but also due to the material balancing of the free enthalpies of the reactions that take place during the smelting process in the apparatus of the invention.

We have provided for the process of our invention a novel converter which differs from the vertical or horizontal metallurgical converters used heretofore (e.g. for the production of steel). This novel converter has given satisfactory results in a continuous converter copper production process. The novel converter has been designed so as to be particularly adapted for the continuous production of converter copper as will be described below.

The novel converter of this invention is stationary; it is firmly secured to a supporting base and is continuously supplied with an ore concentrate charge. The converter copper and the by-products of the smelting process are continuously discharged from the converter.

In order to make the invention clearly understood, reference will be made to the accompanying drawing in which:

FIG. 1 is a schematic illustration in cross-sectional elevation of the apparatus forming part of our invention; and FIG. 2 is a schematic detailed illustration in cross-section of the jet blower passage of the apparatus illustrated in FIG. 1.

Referring now to the drawing, the apparatus of our invention is first heated in a running-in period to a temperature of 1200–1400° C. The apparatus is formed by walls 2a of the usual refractory brickwork. The charge of finely divided ore concentrate is passed from a source of granulated ore concentrate into the interior of the apparatus through a jet blower passage generally designated by 1. This passage 1 extends through a specially constructed refractory block 2. Due to the 1200–1400° C. temperature, which is present in the interior of the device, the ore concentrate charge is melted down. The ore concentrate charge continues to be supplied to the interior of the device until the surface of the molten ore concentrate reaches an optimum distance from the lower end 2b of the refractory block 2. This optimum distance ranges advantageously from 5 to 20 cm. By maintaining this distance, premature solidification of the molten charge is avoided.

After the interior of the converter has been filled to the aforedescribed level, the molten ore concentrate charge is oxidized by means of pressurized gas which is also injected from a source of pressurized oxidizing gas through the aforementioned jet blower passage 1. The pressurized gas is injected until the three layers have been completely formed, namely a layer of slag 3, a layer of "white matte" 4, and a layer of converter copper 5.

The duration of the running-in period depends on the composition of the charge and on the size of the equipment used. The running-in period can be reduced by using as a charge sulfidic materials with higher copper contents, such as "copper matte" or "white matte," instead of the copper-bearing ore concentrates.

The jet blower passage 1, which is illustrated in detail in FIG. 2 comprises two tubes 9 and 10, which are coaxially arranged with respect to each other. The outer tube 9 is provided with a nozzle 13 at its lower end. The nozzle 13 distributes the pressurized oxidizing gas into the interior of the device in a special manner, as will be described below. The inner tube 10 conducts the finely granulated charge into the interior of the device. The pressurized gas, when passing through the nozzle 13, produces a subatmospheric pressure at the outlet side thereof which sucks the finely granulated charge out of the coaxially arranged tube 10 and into the space 8a immediately below the lower end 2b of the refractory block 2. The existing jet of pressurized gas assumes the shape of a cone generally designated as 11 in FIG. 1. Inside the cone 11 of pressurized gas a smaller cone 12 of the granulated charge is formed. The cone 11 protects the charge in the cone 12 against mechanical dissipation. The pressurized gas and granulated charge impinge on the melt in the area 3a, which causes a spattering of the latter. The spattered melt hits the lower surface 2b of the protective refractory block 2 where it forms a thin protective coating. The latter protects the refractory block 2 from mechanical wear. It is important to note that the distance between the bottom surface 2b of the block 2 and the top surface of the melt is such that the thickness of the protective coating remains constant. This design criteria requires that, after a predetermined thickness of the protective coating has been attained, a balance between the amount of melt spattered onto the bottom surface 2b and the amount of melt which falls back onto the surface of the molten bath be maintained.

The bottom surface 2b may be designed as a suspended roof in a modified embodiment of this invention.

A refractory block 2 protects not only the tubes 9 and 10 in the jet blower passage from mechanical wear, but it also serves to prevent the formation of a layer of spattered melt on the outside surface of the jet blower passage 1. Were it not for the presence of the protective refractory block 2, the spattered melt would gradually form a layer around the nozzle 13 and the tube 9 and, consequently, interfere with the formation of the core 11 of pressurized gas.

The rate of charge depends on the amount and concentration of oxygen in the pressurized oxidizing gas. The magnitude of the pressure of oxidizing gas must be sufficiently large so as to penetrate completely the layer of slag and to react with the layer of white matte. The percentage of oxygen in the pressurized gas is determined in dependence with the thermal balance of the process.

The slag continuously runs off through the hole 6 and is collected thereafter. Converter copper is continuously collected through the hole 7. The other gaseous by-products exit through the opening 8. Thus the converter gases, which are very rich in sulfur dioxide, exit through the opening 8 and are collected for further utilization, such as heat energy utilization, production of refined sulfur, utilization of fly ash and the collection of volatilized metals.

The apparatus and method forming our invention offer many advantages, some of which are listed below as follows:

(1) The process is carried under stable temperature conditions.

(2) The maximum temperature of the process occurs in the region of chemical reaction, that is to say in the region of the cones 11 and 12. The maximum temperature region is, however, sufficiently spaced from the lining 2a of the continuously operating converter to minimize its effects thereon.

The design and operating conditions as set forth in paragraphs (1) and (2) make it possible to operate the converter without the necessity of replacing the lining 2a, since the latter has, under the aforelisted conditions, a practically unlimited service life.

(3) Lastly it should be noted that the apparatus and method of our invention are particularly advantageous in the processing of polymetallic ore concentrates, which generally contain a number of metals that are volatilized during the smelting process. These volatilized metals form part of the fly ash and exit with it through the opening 8. Since the walls 8 of the converter of this invention can be made to be hermetically sealed, the trapping of the fly ash can be accomplished at maximum efficiency.

The method and apparatus of the invention are not restricted to the embodiment which has been described and illustrated in the accompanying drawing. Modifications may be made without departing in any way from the scope of the invention.

What we claim is:

1. In a copper-converter plant for continuously producing converter copper from sulfidic copper-bearing ore concentrates, an apparatus comprising, in combination, a container having walls of refractory material, an inlet passage extending through said walls, said inlet passage comprising a first tube for conducting pressurized oxidizing gas from a source of such gas into said container, a second smaller tube coaxially arranged within said first tube for conducting granulated copper-bearing ore concentrates from a source of such concentrates into said container, said first tube has a nozzle axially mounted at its lower end, and said second tube extends at least partially into said nozzle, said granulated ore concentrates forming a melt in said container, the surfaces of said melt reaching an optimum height after a running-in period, said surface, at its optimum height being in spaced relationship from the lower end of said inlet passage, whereby said pressurized oxidizing gas, after exiting from said nozzle, forms a first jet of conical shape, and said granulated ore concentrate is sucked out of said second tube by said first jet of conical shape, so as to form, after exiting from said second tube, a second smaller jet of conical shape inside said first jet.

2. In a copper converter plant for continuously producing converter copper from sulfidic copper-bearing ore concentrates, the apparatus as set forth in claim 1, wherein said inlet passage is surrounded by a block of refractory material which serves to protect said first and second tubes from spattered melt of said ore concentrates located in said container.

3. In a copper converter plant for continuously producing converter copper from sulfidic copper-bearing ore concentrates, the apparatus as set forth in claim 2, wherein the distance between said surface of the melt, at its optimum height, and the bottom surface of said block of refractory material is in the range from 5 cm to 20 cm.

4. In a copper converter plant for continuously producing converter copper from sulfidic copper-bearing ore concentrates, the apparatus as set forth in claim 1, wherein said melt of ore concentrates forms in said container after said running-in period, a bottom layer of converter copper, a middle layer of white matte, and a top layer of slag.

5. In a copper converter plant for continuously producing converter copper from sulfidic copper-bearing ore concentrates, the apparatus as set forth in claim 4, wherein said container includes a first outlet formed with hermetically sealed walls for continuously conducting gases produced in said container during the process taking place therein to a processing plant, a second outlet for discharging said top layer of slag, and a third outlet for discharging said bottom layer of converter copper.

6. In a copper converter plant for continuously producing converter copper from sulfidic copper-bearing ore concentrates, the apparatus as set forth in claim 1, wherein said first jet of pressurized oxidizing gas protects the granulated ore concentrates located in said second jet from mechanical dissipation.

7. In a copper converter plant for continuously producing converter copper from sulfidic copper-bearing ore concentrates, the apparatus as set forth in claim 1, wherein said container is fixedly mounted on a stationary base.

References Cited
UNITED STATES PATENTS

| | | | |
|---|---|---|---|
| 3,241,825 | 3/1966 | Jilek | 75—60 X |
| 3,304,173 | 2/1967 | Smith | 75—52 |
| 3,317,309 | 5/1967 | Rinesch | 75—43 |

FOREIGN PATENTS 104,449  7/1962  Czechoslovakia.

L. DEWAYNE RUTLEDGE, Primary Examiner

J. E. LEGRU, Assistant Examiner

U.S. Cl. X.R.

75—10, 60, 72, 73; 266—37